T. L. WOLFE.
MOLDING APPARATUS FOR FORMING CONCRETE STRUCTURES.
APPLICATION FILED OCT. 10, 1916.

1,292,203. Patented Jan. 21, 1919.
5 SHEETS—SHEET 1.

T. L. WOLFE.
MOLDING APPARATUS FOR FORMING CONCRETE STRUCTURES.
APPLICATION FILED OCT. 10, 1916.

1,292,203.

Patented Jan. 21, 1919.
5 SHEETS—SHEET 5.

Witness
Edwin L Bradford

Inventor
Thos. L. Wolfe
By Wm O. Dyre
Attorney

UNITED STATES PATENT OFFICE.

THOMAS L. WOLFE, OF ATLANTA, GEORGIA.

MOLDING APPARATUS FOR FORMING CONCRETE STRUCTURES.

1,292,203.            Specification of Letters Patent.      Patented Jan. 21, 1919.

Application filed October 10, 1916. Serial No. 124,812.

*To all whom it may concern:*

Be it known that I, THOMAS L. WOLFE, a citizen of the United States, residing at Atlanta, in the county of Fulton and State of Georgia, have invented certain new and useful Improvements in Molding Apparatus for Forming Concrete Structures; and I do hereby declare the following to be a full, clear, and exact description of the invention, such as will enable others skilled in the art to which it appertains to make and use the same.

My invention relates to collapsible molds or centers for use in the formation of monolithic culverts, conduits, storm sewers, aqueducts, subways, tunnels, and similar structures, of concrete or other suitable moldable materials.

More particularly stated the present invention relates to a system of molds of the character indicated, formed primarily of adjustable overlapping and reinforced sheet metal plates capable of being readily assembled or collapsed, and of being moved forward in telescopic relation as the work advances, also capable of serving as temporary supports for the finished structures whether formed by tunneling, or by cut and fill engineering methods.

One object of the present invention is therefore to provide an improved construction of collapsible and adjustable forms for the purposes indicated, of light and durable sheet-metal scale-plates coöperatively arranged.

Another object is that of obtaining in a relatively light set of form plates great strength and rigidity by agency of longitudinal bends in the plates themselves, and of longitudinal reinforcing ribs, flanges, or edge folds, as distinguished from the transverse reinforcing ribs commonly used at frequent intervals in ordinary forms.

A further object is that of standardizing the scale-plates referred to, and thereby adapting them for use in the construction of forms of either large or small diameter with equal facility and smoothness of exterior surface.

A further object is the production of novel and efficient means for collapsing and spreading the form sections, and for transporting them when collapsed or folded, from one position to another as the work progresses.

With the foregoing and other objects and advantages in view the invention will be hereinafter particularly described and then pointed out in the claims following.

In the accompanying drawings which form part of this application for Letters Patent, and whereon like characters refer to corresponding parts in the several views:

Fig. 5 is an end elevation of one complete form-section ready for pouring, and of an additional invert or bottom member collapsed in process of loading upon the transporting truck as indicated by Fig. 4.

Fig. 12 is a side elevation of a detached spreader block for use when lifting the bottom form member as shown by Fig. 5, and Figs. 13, 14, 15, 16 show in section one end of several modified reinforcing edges for the scale plates shown by Fig. 9.

Reference being had to the drawings and numerals thereon it will be noted that a complete form-section comprises invert and superimposed convex mating elements, hereinafter termed upper and lower members respectively, and that each of said members is formed of two segmental sections hinged together in pairs, and adapted to be folded inwardly at their free ends. In practice, a number of such complete form-sections are coöperatively employed. These, however, are counterparts one of another, and for that reason a description of one section will suffice for all.

At both ends of the form-section upper member corresponding segmental flanges 20, 20′ are provided the same being hinged together on the vertical center line of said section as at 21; and likewise at opposite ends of said lower member are provided segmental flanges 22, 22′, hinged together as at 23. Preferably the said flanges are made of cast steel or malleableized iron, but obviously they may be contructed of standard steel angles or channels of any desired cross sectional area, that shown by Fig. 8 of the drawings being well suited, because of its great strength, rigidity, and economy of space or inside clearance. Moreover, it will be observed that the points of contact of said flanges 20, 22 and 20′, 22′ are here shown in the form of inclined planes 24, 24 radiating from the aforesaid top pivot or hinge 21, adapted to be detachably secured by bolts 25; and when so secured to form continuous transverse flanges the size and shape of which determines that of the completed form section, which in the present illustrations is shown as circular merely by way of exemplification.

At 26, 26, 26, 26 the said transverse flanges are provided with horizontal bolt holes by means of which corresponding flanges of adjacent form sections may be temporarily bolted together during use as will later appear; and rigidly secured to the same flanges are pintles 27, 27 projecting inwardly from both sets of top segments 20 and 20′, and pintles 28, 28 extending inwardly from both sets of bottom segments 22 and 22′, also for purposes which will later appear.

Figures 1, 8, 9:
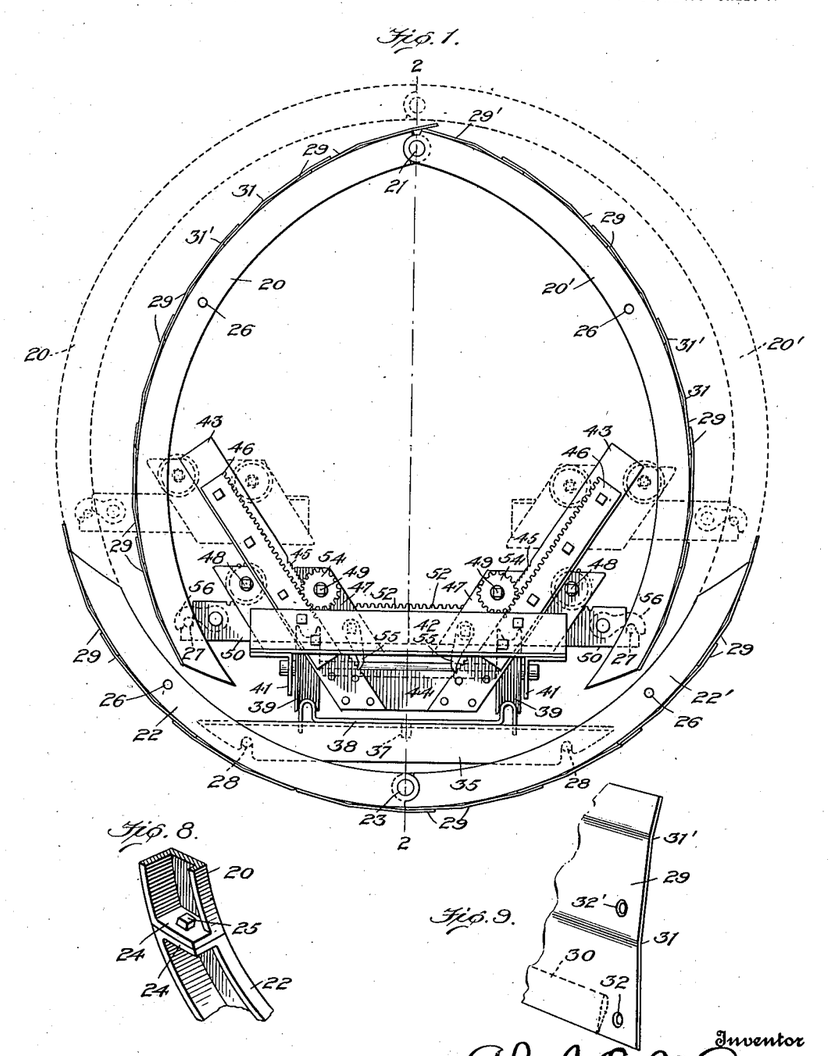
Figure 1 is an end view of one form-section showing the invert or bottom member in final position, and the convex or top member collapsed and supported upon a transporting and manipulating truck or carriage the latter also being shown in end elevation.
Fig. 8 is a fragmentary view in perspective, showing one of the joined edges of segmental transverse supporting ribs employed at the ends of the form sections.
Fig. 9 is also a fragmentary view in perspective showing one end of one longitudinally bent and reinforced scale-plate of which both top and bottom form members are composed.
Figure 3:
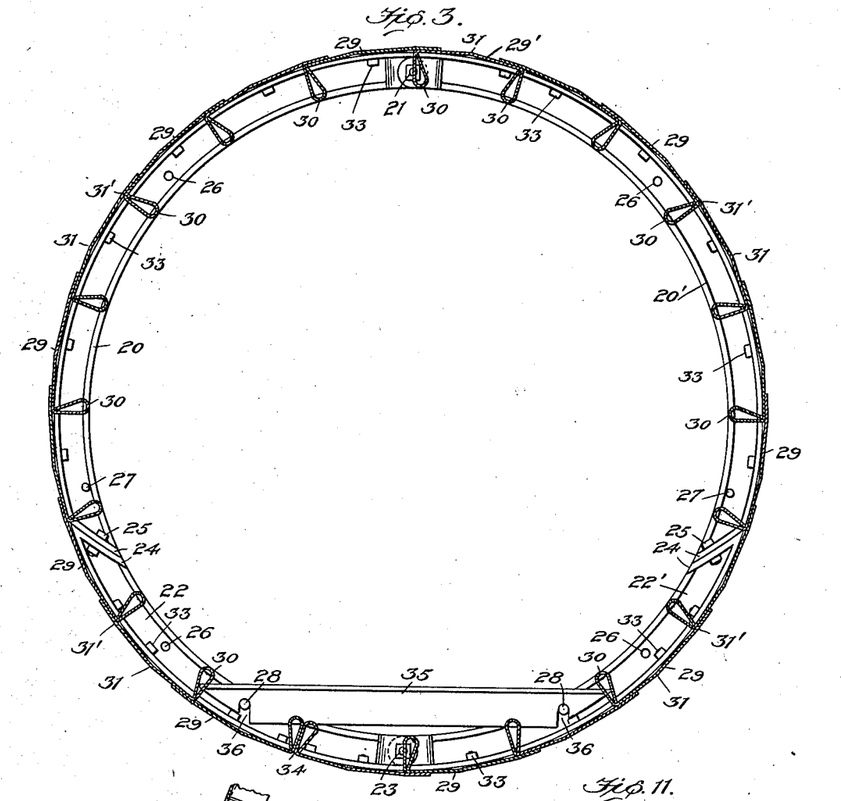
Fig. 3 is a vertical section taken transversely through one complete form-section with transporting truck removed.

Extending from end to end of the form section, and connecting oppositely disposed top segmental flanges 20, 20 and 20′, 20′ in pairs, is a series of scale plates 29 by preference formed of relatively light sheet steel as shown by Fig. 9. While in like manner connecting the oppositely arranged bottom segmental flanges 22, 22 and 22′, 22′ in pairs is a corresponding series of the scale plates 29, in the same overlapped relation, which collectively encircle the form-section, as best shown by Fig. 3. These plates with the exception of one, are counterparts, each having one inturned edge, constituting a reinforcing flange or loop 30, each bent longitudinally as at 31, 31′ to afford additional rigidity, and each doubly perforated upon both ends as at 32, 32′ by suitable countersunk bolt holes, through which latter means the said plates are standardized and rendered available for use in forms of various diameters.

Viewing the upper and lower form sections collectively and in expanded position ready for use, as best shown by Fig. 3, it will be noted that both ends of the plates 29 are securely, but removably, bolted, as at 33, to the periphery of all segmental flanges 20, 20, 22′ and 22′ in a continuous circumferential series, commencing for example at 34 where two of the longitudinal flanges or loops 30 abut and proceeding in opposite directions in successively overlapping relation to a point adjacent the top center or hinge point of the upper form member. Here there is interposed a special plate 29′ having the usual longitudinal bend 31 at its center, and the usual loop or reinforcing flange 30 upon both edges rather than upon one edge only, so as to provide an additional longitudinal support at a point where otherwise there would be two unsupported overlapping edges. And by substantially this arrangement of plates 29 it will be further observed that all joints and pivotal or hinged connections between the upper and lower form members are systematically covered by the projecting overlapping flat edges of said plates, that the reinforcing loops 30 extend practically from end to end of each plate, being radially arranged the better to resist outside pressure, and that each plate 29 is further stiffened by its respective longitudinal bend 31 and 31' extending from end to end thereof.

Figure 2:
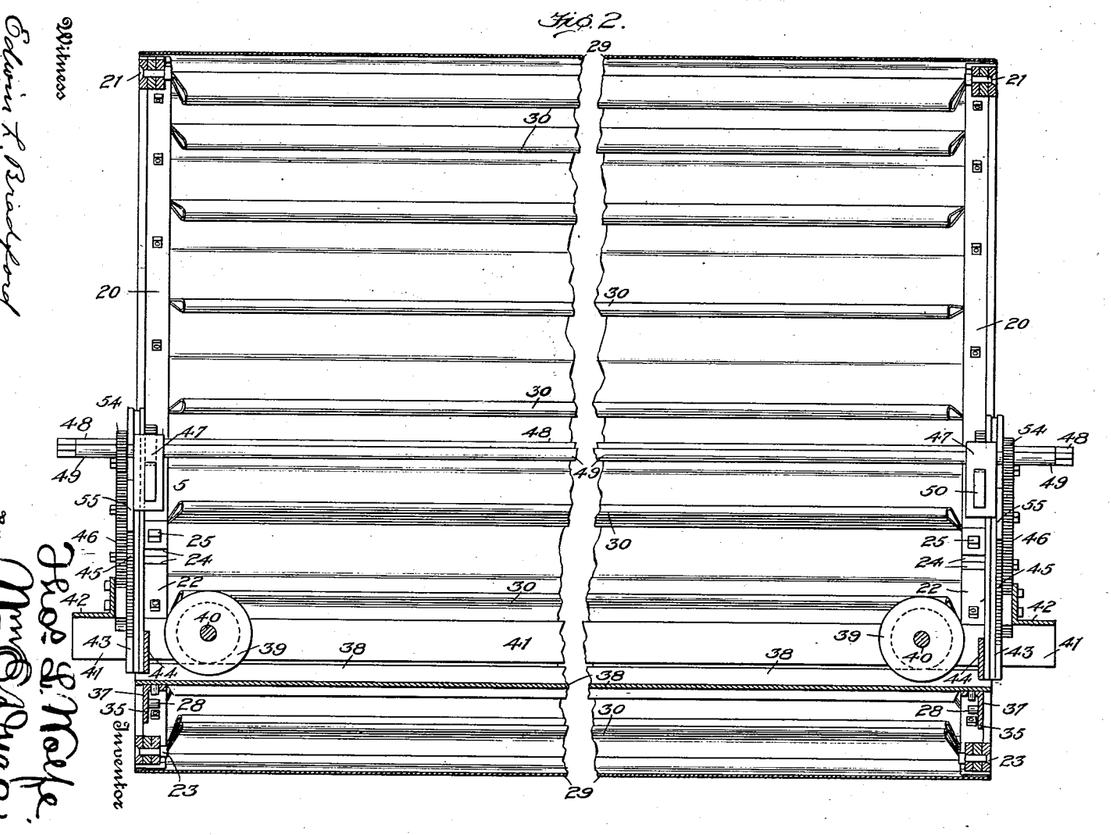
Fig. 2 is a longitudinal vertical section through one form-section and transporting truck, taken on the line 2—2 of Fig. 1 with the top section, however, in final position as indicated by dotted lines in said Fig. 1.
Figures 5, 12, 13, 14, 15, 16:
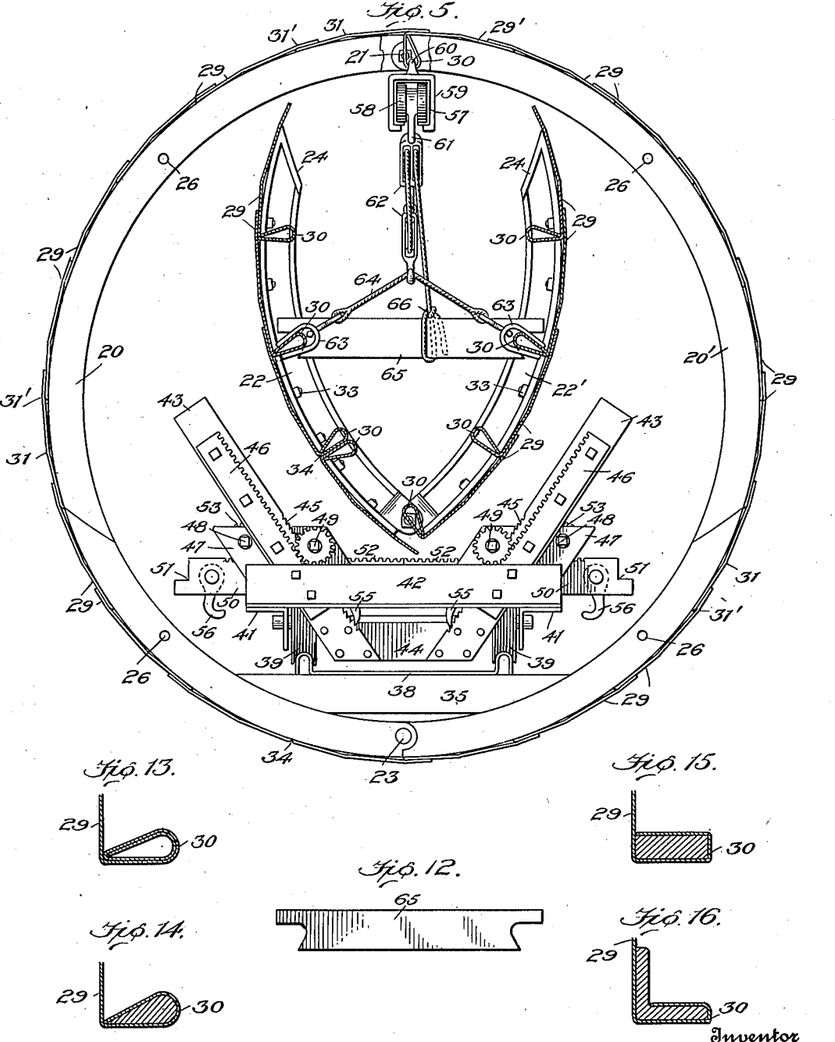

Within the lower form member at both ends thereof, when expanded and in position for use, there are located removable spreaders 35, preferably formed of simple steel angles as shown by Figs. 1, 3 and 5, having tapered ends to clear the curvature of the transverse segmental flange members 22 and 22', and notched as at 36 so as to straddle pintles 28 projecting from said segmental flange members. The uppermost horizontal angle of both spreaders 35 is centrally perforated as shown by dotted lines in Fig. 1; and, removably interlocking with these perforations are pins 37 projecting downward from opposite ends of a readily removable track section 38, preferably of unitary sheet steel construction as clearly shown by Figs. 1, 2 and 5.

Upon the said track 38 may be mounted the wheels 39 of a specially constructed truck or carriage for transporting collapsed form sections when required and for manipulating the upper and lower form members to expand or collapse them as occasion requires. This truck or carriage comprises primarily the wheels 39, axles 40, and a rectangular frame consisting of side angle bars 41, connected at both ends by angular end sills 42. To the inner vertical face of both cross sills 42 are securely bolted oppositely disposed inclined standards 43, 43, rigidly connected below by a transverse tie plate 44, having upon their inner edges ratchet teeth 45, and provided with racks 46 upon their outer faces.

Slidably mounted in dovetailed relation upon each standard 43 is a manipulating block 47 in which are journaled operating shafts 48 and 49 having squared terminals and connecting said blocks 47 in pairs at opposite ends of the truck; and, passing horizontally through each of said blocks, in reciprocal relation, is a spreader and collapsing bar 50 having a notched outer end 51, and having upon its upper edge a rack 52, as clearly shown by Figs. 1, 2, 5, 6 and 7.

Upon opposite ends of both shafts 48 and 49 are secured pinions 53 and 54 in constant mesh with racks 52 and 46 respectively and capable of reciprocating said racks 52, and the aforesaid blocks 47, with their attending parts when the shafts are rotated at either end by agency of a suitable crank (not shown). Pivotally connected to each block 47 there is also a pawl 55 adapted to engage ratchet teeth 45 for the purpose of retaining its standard 43 in a more or less elevated position when required, and likewise at the outer notched end of each spreader or collapsing bar 50 there is pivoted a swinging hook 56 for purposes that will later appear.

Figures 4, 6, 7:
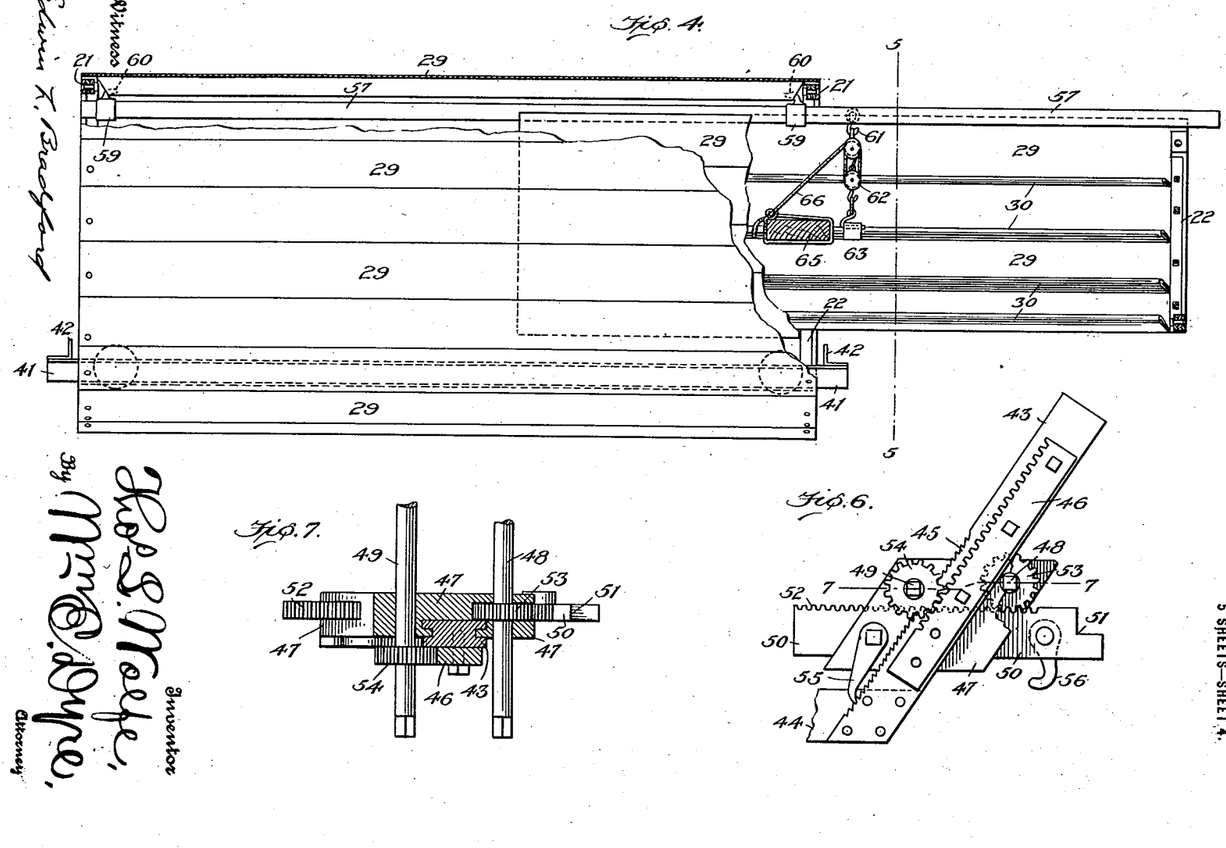
Fig. 4 is a side elevation of one form-section, upon a relatively reduced scale, partly broken away to disclose an overhead trolley rail, and also a sectional view of another collapsed form-section, in process of loading upon the transporting truck.
Fig. 6 is a fragmentary view in end elevation at one side of the transporting truck and top member manipulating mechanism.
Fig. 7 is likewise a fragmentary view taken on the line 7—7 of Fig. 6 showing the same parts which are illustrated by said Fig. 6.

As a means of elevating a form bottom or lower member when collapsed, and of loading same upon, or removing it from, the transporting truck hereinbefore described, while the latter is in an adjoining form section, an overhead trolley or carrier is provided comprising a trolley rail 57, preferably of sheet steel and of hollow construction having an open but constricted bottom serving as a monorail for trolley wheel 58, as best shown by Fig. 5. Embracing said monorail 57 are slidable hangers 59 each provided with an inturned spur 60 adapted to enter opposite ends of one reinforcing loop 30 at top of the form upper member as shown by Figs. 4 and 5, by which arrangement it is quite obvious that wheel 58 may freely traverse the entire length of its supporting rail 57 including its outboard or overhanging end.

Depending from the trolley wheel 58 is a hook 61 to which is attached an ordinary block and fall 62. In practice this lifting tackle is readily secured when required to a form bottom or lower member at its center of balance, by agency of two enlarged relatively stiff steel loops 63 having converging sides conforming in shape closely to the sides of the plate loops 30 over two of which latter they are slipped from one end to a position indicated by Figs. 4 and 5. The said loops 63 are then readily engaged by hook terminals of a sling 64 which in turn is hooked to the aforesaid tackle 62 as the lifting agency. As a means of limiting the extent to which the form bottom or lower member may be folded or collapsed preliminary to lifting the same and placing it upon the transporting truck, there is provided a spreader or space block 65 having notched ends for loosely engaging two of the oppositely disposed longitudinally arranged reinforcing loops 30, as best shown by Fig. 5, and to this space block may conveniently be hitched the free end of lifting halyard 66.

Figure 10:
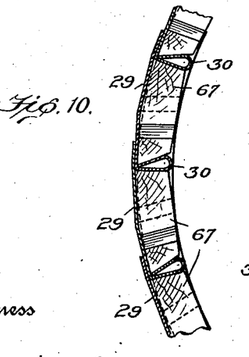
Fig. 10 is a fragmentary view showing in vertical section one means of further reinforcing both form members to provide for excessive load conditions when required as in the construction of very heavy work.
Figure 11:
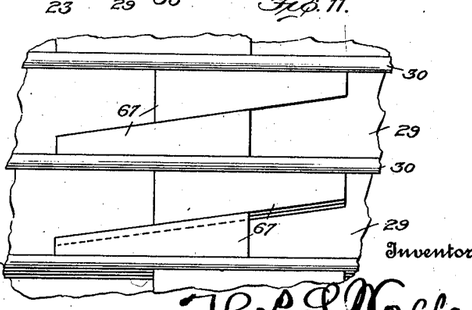
Fig. 11 is a fragmentary view showing in plan the reinforcing wedges of Fig. 10.

The foregoing is a description of my present invention in its best form of construction at present known to me, it should, however, be understood that I do not consider myself restricted, or confined in any sense of the word, to the particular form, arrangement or combination of parts herein shown and described, which may be variously rearranged and modified within the scope and meaning of the appended claims, without in the least departing from the spirit of the invention. As for example, the particular form of inturned longitudinal reinforcing edge 30 of scale plates indicated by Fig. 9 of the present drawings may be variously modified, and if desired provided with fillers to meet different load requirements, as indicated by Figs. 13, 14, 15 and 16. And when desired as a substitute for additional transverse stiffening ribs at a point or points intermediate of those at the ends of each form section, a circumferential series of filler or wedge blocks 67 may be employed between the longitudinal stiffening or reinforcing loops 30, as shown by Figs. 10 and 11, and it will be apparent that the wedge form of said blocks adapts them for service whether the loop members 30 be more or less widely separated.

To persons skilled in the art to which this invention relates, the practical advantages of forms and equipment constructed substantially as hereinbefore described will be quite evident, it may be noted, however, that best results are obtained by the concurrent use of a number of complete form sections sufficient to care for at least one full day's work, and that said sections are preferably of comparatively short lengths capable of independent and convenient operation, in the course of setting up or collapsing them, or of transporting the collapsed upper and lower form members telescopically through adjacent form sections as the work progresses.

Briefly stated, one use and operation of the present equipment is as follows:

An expended bottom or lower form member having been positioned in a suitable excavation, concrete may then be conveniently tamped around and beneath same. Within the member thus positioned is then located one section of a sectional and readily removable track 38, and upon same is next mounted a suitable transporting and manipulating truck or carriage such as hereinbefore described.

Pintles 27, 27 projecting inwardly from the end segmental flanges 20 and 20' of one partially collapsed upper form member are now received in the oppositely disposed notched ends 51, 51 of horizontal spreader and collapsing bars 50, 50, and there retained by agency of hooks 56, 56, swung over the said pintles 27, 27, as shown by Fig. 1. By means of a suitable crank (not shown) applied to either squared end of operating shaft 49 pinions 54 are caused to ascend the inclined racks 46 taking with them their respective manipulating blocks 47 and drag pawls 55, the latter traveling over the teeth of ratchet 45 to retain said blocks 47 and attending parts in elevated position. Both sides of a collapsed upper form member having been thus elevated to a predetermined position, the operating cranks aforesaid are thereupon transferred from shafts 49 to either end of shafts 48. Rotation of these latter shafts in the proper direction now causes both horizontal bars 50 to be projected in opposite directions by agency of spur gears 53 meshing with their respective racks 52 upon the upper edge of each bar 50, thereby expanding the said upper form section into the position indicated by dotted lines in Fig. 1, causing the inclined plane surfaces 24 of both upper and lower transverse flanges 20, 22 and 20', 22' to register, as shown by Fig. 8, whereupon the same may be securely bolted together, as shown by Fig. 3 to produce one complete form section.

In like manner other form sections are completed and securely bolted together through holes 26 in adjacent transverse ribs at both ends of each, there being a section of track 38 laid in each as aforesaid. A suitable number of complete form sections having thus been assembled, concrete is next poured or otherwise applied over and about same in the usual manner, after which follows the process of collapsing, transporting and reassembling both the upper and lower members from one end to the other of the work in course of construction. If the culvert, conduit or sewer be of small diameter, this may easily be accomplished by loading one or both members of each section upon the truck aforesaid and simply hauling same through the successive sections by means of a cable (not shown). If, however, the structure be of large diameter the work is attended with greater difficulties, and is accomplished substantially as follows:

Concrete having sufficiently hardened around and about one or more complete form sections, the transporting truck is positioned immediately within the first of said sections, the upper and lower members whereof are then separated by the removal of all connecting bolts; pintles 27, 27 of the said upper member are next received in the notched ends of bars 50, as before, and by a reversal of the operation hereinbefore described the segmental sections 20 and 20' are first drawn together or collapsed and then lowered upon said truck into the position shown by full lines in Fig. 1. Obviously, this section may then readily be transported throughout all succeeding form sections onto an advance or pilot lower member previously laid and tamped into final position, there to be raised and expanded into position for use in its new location as before.

The foremost of the upper form members having been thus transported it now remains to similarly remove its corresponding lower member, and to transport same through all form sections to its advance or pilot position beyond. For this purpose the overhead trolley carrier 57 is positioned as hereinbefore described, with its projecting end overhanging approximately half of the lower member to be removed. By means of the tackle 62, sling 64, clips 63, and space block 65 the said lower member is readily collapsed and elevated to the position shown by Fig. 5, whereupon it may be advanced upon monorail 57 to a position directly over the transporting truck in the next complete form section, and lowered. Hoisting tackle 62 being now released the collapsed lower member under consideration is next transported through all complete form sections to the last, into which also the overhead trolley carrier 57 is thereupon rigged, as shown by Fig. 4 of the drawings. Here the collapsed lower form member is lifted from the transporting truck by means of the hoisting tackle 62, as before described, is conducted along the overhanging monorail 57, is lowered into its final position, and securely bolted in place to receive the next oncoming top member as the work progresses.

Obviously, this operation may be repeated with great facility and efficiency so long as it may be necessary, the various form sections and members thereof never being idle, but serving successively and repeatedly in the aforesaid systematic process of form building. As soon as a form section has served its purpose in one position it is immediately transported to a new position, and so on until the work is completed. And while it is unnecessary to further enumerate the advantages flowing from the present invention, it might in conclusion be noted that the same scale plates 29 are adapted for use in the construction of forms generally whether of large or small diameter. Ordinarily, they are bolted to segmental flanges 20 and 22 at both ends by means of the outermost countersunk holes 32', but where greater loads are imposed, and as a consequence greater strength required, as in sewers, conduits, etc., of large diameter, the innermost of said bolt holes 32 may be employed. In this latter arrangement it is apparent that the longitudinal reinforcing loops or ribbed edges 30 of said plates would be more frequent and as a consequence the structure more rigid without the necessity of additional transverse ribs.

Having thus described my invention, what I now claim and desire to secure by Letters Patent is:

1. In a collapsible form for shaping concrete structures, the combination with upper and lower members hinged together in oppositely disposed sections and detachably connected in a plane below the horizontal center of the form, of a movable carriage arranged and adapted to be detachably connected to said upper member, and means carried by said carriage for expanding and contracting the said upper member.

2. In a collapsible form for shaping concrete structures, the combination with upper and lower hinged members detachably connected in a plane below the horizontal center of the form, of a carriage movable upon the said lower member arranged and adapted to be detachably connected to said upper member, and means including oppositely disposed elevating and expanding devices mounted upon said carrier for positioning the upper member upon the said lower member.

3. In a collapsible form for shaping concrete structures, the combination with upper and lower hinged members separable at a point below the horizontal diameter of the said form, of means including portable elevating and expanding devices arranged and adapted to be detachably connected to the said upper member near the free ends thereof for maintaining said upper member in a partially expanded condition when removed from the lower member, whereby the said lower member when collapsed can be positioned within the said upper member.

4. In a collapsible form for shaping concrete structures, the combination with upper and lower hinged members, of means including portable elevating and expanding devices arranged and adapted to be detachably connected to the said upper member, and means comprising a traveling carrier supported by the upper member when in expanded position for collapsing and transporting the lower member.

5. In a collapsible form for concrete structures, the combination with upper and lower hinged members detachably connected in a plane below the horizontal center of the form, of means including a truck for transporting the said hinged members throughout the form, elevating and expanding devices carried by said truck arranged and adapted to be detachably connected to the upper member at a point below the horizontal diameter of the said form, and means for operating said elevating and expanding devices.

6. In a molding apparatus for sewers, tunnels, conduits and the like, the combination with a series of collapsible forms composed of upper and lower hinged members, of means including a truck for transporting the said hinged members throughout the series of forms, elevating and expanding devices carried by said truck arranged and adapted to be detachably connected to the upper hinged members at a point near the free ends thereof, and means including a traveling carrier for collapsing and positioning the lower member on the aforesaid truck independently of the upper member.

7. In a molding apparatus for sewers, tunnels, conduits and the like, the combination with a series of collapsible forms composed of upper and lower hinged members, of means including a truck for transporting the said hinged members throughout said series of forms, elevating and expanding devices carried by said truck arranged and adapted to be detachably connected to the upper member and comprising horizontally and upwardly arranged rack bars, pinions for moving said horizontal rack bars, and means for operating said pinions.

8. In a molding apparatus for sewers, tunnels, conduits and the like, the combination with a series of collapsible forms composed of upper and lower hinged members connected in a plane below the horizontal diameter of the series of forms, of means including a truck for transporting the said hinged members throughout the series of forms, elevating and expanding devices carried by said truck arranged and adapted to be detachably connected to the said upper members at the free ends thereof below the horizontal diameter of the forms the said devices comprising horizontally and upwardly arranged rack bars with intermeshing rotatable pinions for moving said horizontally arranged rack bars, and means including a traveling carrier supported by an adjacent expanded upper member for collapsing and positioning the lower member upon the aforesaid truck.

9. In a molding apparatus for sewers, tunnels, conduits and the like, the combination with a series of collapsible forms composed of upper and lower hinged members, of means including a truck for transporting the said hinged members throughout the series of forms, elevating and expanding devices for said upper hinged members carried by said truck, means comprising receiving shoulders and engaging hooks for detachably connecting the said elevating and expanding devices to the free ends of the upper hinged members, and means for operating the elevating and expanding devices.

10. In a molding apparatus for sewers, tunnels, conduits and the like, the combination with a series of collapsible forms composed of upper and lower hinged members, of means including a truck for transporting the said hinged members throughout the series of forms, elevating and expanding devices carried by said truck including oppositely disposed horizontal and upwardly arranged rack bars, fastening devices provided on the ends of said horizontal rack bars for connecting the said elevating and expanding devices to the upper hinged members, and means for moving the said horizontally disposed rack bars in reverse direction.

11. A mold for sewers, tunnels, conduits and the like, including in combination upper and lower hinged members formed of end flanges and overlapping circumferentially arranged plates connecting said flanges, reinforcing ribs provided on said circumferentially arranged plates extending between the said end flanges, and means for detachably securing the upper and lower hinged members together.

12. A mold for sewers, tunnels, conduits and the like, including in combination upper and lower form members hinged together in opositely disposed sections formed of overlapping circumferentially arranged plates having inwardly projecting reinforcing ribs of loop formation, and means for detachably securing the said upper and lower form members together.

13. A mold for sewers, tunnels, conduits and the like, including in combination upper and lower hinged members formed of adjustably overlapping circumferentially arranged longitudinally stiffened plates having inwardly projecting reinforcing ribs upon one edge, and means for detachably securing the said upper and lower hinged members together.

14. A mold for sewers, tunnels, conduits and the like, including in combination upper and lower hinged members formed of end flanges and adjustably overlapping circumferentially arranged longitudinally stiffened plates connecting said flanges, reinforcing ribs formed integral with said plates and projecting inwardly within the mold between the end flanges, and means for detachably securing the said upper and lower members together.

15. A mold for sewers, tunnels, conduits and the like, including in combination upper and lower hinged members formed of overlapping circumferentially arranged plates having reinforcing ribs formed thereon and adapted to extend inwardly within the mold, means including a plurality of circumferentially arranged reinforcing wedges disposed between the aforesaid ribs, and means for detachably securing the upper and lower members together.

16. A mold for sewers, tunnels, conduits and the like, including in combination upper and lower hinged members formed of end flanges and overlapping plates connecting said flanges having hollow ribs extending inwardly within said mold, reinforcing elements adapted to be fitted into the said hollow ribs, and means for detachably securing the said upper and lower hinged members together.

17. A mold for sewers, tunnels, conduits and the like, including in combination upper and lower hinged members formed of end flanges and overlapping circumferentially arranged plates connecting said flanges, and means including inclined abutting surfaces for detachably securing the upper and lower members together in a plane below the center of the form and radiating from the pivotal connection of said upper hinged members.

18. A mold for sewers, tunnels, conduits and the like, including in combination a series of adjustably overlapping circumferentially arranged scale plates each comprising a longitudinal reinforcing rib and a parallel strengthening band extending from end to end thereof.

In testimony whereof I affix my signature, in presence of two subscribing witnesses.

THOMAS L. WOLFE.

Witnesses:
M. D. CARMICHAEL,
GEO. W. COLEMAN.